Patented June 24, 1930

1,765,616

UNITED STATES PATENT OFFICE

FRANK LOUIS ROMAN, OF CHICAGO, AND HARRY THOMAS WINSEMIUS, OF CONGRESS PARK, ILLINOIS, ASSIGNORS TO WESTERN ELECTRIC COMPANY, INCORPORATED, OF NEW YORK, N. Y., A CORPORATION OF NEW YORK

CEMENTITIOUS SUBSTANCE AND METHOD OF MAKING THE SAME

No Drawing.  Application filed December 31, 1924. Serial No. 758,990.

This invention relates to cementitious substances and methods of making the same.

By the term "cementitious substances" as here used is meant not only compositions which are used for the purpose of joining materials together, but also that class of substances which are made to adhere to other substances while not used primarily for the purpose of joining. The first-mentioned class is generally referred to by use of the term cement, glue, or adhesive. The second classification generally includes materials which are used for the sizing of paper, the filling of cloth, and the like. Throughout the following description the term cementitious substance will be used to apply to both of the classes of materials referred to.

Adhesives of the highest strength are generally made from animal matter and are usually referred to as glues. These materials, for strictly adhesive purposes, are very desirable, but on account of the corrosive properties which they have, particularly when old, they are very undesirable for certain classes of work. Some of the gums have been used to form high strength adhesives, but they are generally used with inflammable solvents and are sometimes undesirable for this reason. They also dry out quickly and are incapable of thinning except by the use of organic solvents. Such gums as are water soluble may be formed into very desirable adhesives from certain standpoints, but their use is obviously limited by the fact that they cannot be used in any manner where they will be subjected to moisture.

Objects of the present invention are to produce an improved cementitious substance and to provide an improved method for producing such substances.

According to the main features of the invention the method is accomplished by emulsifying a water solution of a water soluble material with a solution of a water insoluble material in an organic solvent in such a manner as to obtain the desirable characteristics of both solutions and improved properties which are not present individually in either solution. The specific adhesive which is the subject matter of the present invention and which is produced by means of this method consists essentially of a water solution of gum arabic and a carbon tetrachloride solution of dammar resin in the form of an emulsion, other materials being added for the purpose of varying the properties such as brittleness of the material after drying.

It is believed that the invention will be fully understood from the following detailed description of a preferred form of cementitious substance and the process of making the same. Various other ingredients, however, may be employed, and the proportions of the ingredients changed without departing from the spirit of the invention which is to be limited only by the scope of the appended claims.

The first step in the production of the improved adhesive is the formation of a solution of gum arabic. This is accomplished by dissolving about 45 to 50 parts by weight of gum arabic in 55 to 50 parts by weight of water, the amount of gum being such as to give a solution having a specific gravity of about 1.22 at 25° C. The second step of the process is to produce a solution of water insoluble resin. Dammar resin is to be preferred for the particular form of adhesive which is sought to be made, good results being obtained by employing the material known commercially as Singapore dammar resin Number 1. This solution is prepared by dissolving about 38 parts by weight of dammar resin in about 48 parts by weight of carbon tetrachloride. If desired about 8 parts by weight of grain alcohol and 6 parts by weight of raw linseed oil may also be incorporated in this solution, the alcohol assisting in the dissolving of the dammar resin and the linseed oil acting in the finished adhesive to reduce the brittleness thereof when dry.

Although these two solutions may be emulsified together and an adhesive produced thereby, it is desirable for optimum results to incorporate therein a solution of shellac made by dissolving about 19 pounds of orange leaf shellac in about three gallons of grain alcohol. A suitable oil, such as rosin oil, may also be included when the preferred formula is employed. The materials referred to may be mixed according to the following formula:

|  | Per cent by weight | Working formula |
|---|---|---|
| Aqueous gum arabic solution (sp. grav. 1.22 at 25° C.) | 63½ | 33 pounds |
| Singapore dammar resin solution in carbon tetrachloride | 23 | 12 pounds |
| Shellac solution in alcohol | 11½ | 6 pounds |
| Rosin oil (heavy grade) | 2 | 1 pint |

In producing an adhesive according to this formula the gum arabic solution is placed in a mechanical mixer and the other ingredients are slowly added in the order given while the mixer is in operation, each ingredient being thoroughly incorporated before the next one is added. Altering the order in which the ingredients are added may prevent the emulsification of the materials. It is found that after the dammar resin has been emulsified with the water solution of gum arabic no difficulty is experienced in emulsifying other ingredients with the preliminary emulsion.

The invention may be employed for the purpose of producing other classes of cementitious substances by substituting other materials or changing the proportions of the materials specified in the preferred formula. For instance, in place of gum arabic in the water solution, glue, starch, or albumen, or water soluble gums, such as cherry gum or gum tragacanth may be used. Instead of dammar resin in the organic solution any one of the water insoluble materials included broadly in the term pitches or resins, such as asphalts, mastic, kauri, copal, colophony or cumar may be employed. Instead of raw linseed oil in the dammar solution paraffin or any light or heavy oil may be employed. Glycerol may also be used, but being water soluble it may be included in either the water solution or organic solution. The solvent used for the non-water soluble material is preferably carbon tetrachloride, the non-inflammable nature of this solvent and its quick drying qualities making it desirable. However, where it is not particularly desirable that the solvent be non-inflammable and where other classes of solvents can be used better with the particular materials employed, for example asphalt, materials such as petroleum distillates or coal tar products, such as benzol, toluol, etc., or other classes of solvents may be very good.

It is apparent, then, that the adhesive represented by the formula given above is only one of a number of similar products which may be made by the use of the method which is the subject matter of this invention. This adhesive is quick drying, possesses high strength, adheres well to both wood and paper and after drying is not affected by moisture. It finds application in the electrical industry in the manufacture of small parts in which an adhesive having these properties and having no tendency to corrode fine copper wire or metal parts in contact with the adhesive is required. In addition the adhesive will not deteriorate for a considerable length of time even if left exposed to the atmosphere, because a protective film is very quickly formed on top of the adhesive in the container and the remainder thereof is protected thereby. The material has no unpleasant odor and even after long standing offensive odors of decomposition such as are often present in fish and hide glues are not encountered. Where the adhesive is to be used for general purposes it is found that it readily adheres to greasy or oily surfaces on which water soluble adhesives are generally unsatisfactory and also adheres well on wood and similar surfaces on which water insoluble adhesives and cements are not generally used. It can be thinned when required by merely adding water and stirring.

What is claimed is:

1. A method of producing a cementitious emulsion which consists in forming a water solution of a water soluble gum, forming a solution of a water insoluble resin in a volatile solvent, and then adding the solution of water insoluble material to the solution of water soluble material to form an emulsion thereof.

2. As a new composition of matter, a cementitious emulsion comprising a gum, a resin, shellac, a water insoluble organic solvent, alcohol and water.

3. As a new composition of matter, a cementitious emulsion comprising gum arabic, dammar resin, shellac, rosin oil, carbon tetrachloride, alcohol and water.

4. As a new composition of matter, a cementitious emulsion comprising a solution of gum arabic in water, throughout which are dispersed a solution of dammar resin in carbon tetrachloride and a solution of shellac in alcohol.

5. As a new composition of matter, a cementitious emulsion consisting of 63½ parts of gum arabic solution in water throughout which are dispersed 23 parts of dammar resin solution in carbon tetrachloride, 11½ parts of a solution of shellac in alcohol, and 2 parts of rosin oil.

6. A method of producing a cementitious emulsion which consists in adding a solution of a water insoluble resin in a volatile organic solvent to a water solution of a water soluble gum to form an emulsion thereof, and dispersing an organic solution of shellac throughout the emulsion to form the finished product.

7. A method of producing a cementitious emulsion, which consists in adding a solution of dammar resin in carbon tetrachloride to a water solution of gum arabic to form an emulsion thereof, and dispersing a solution of shellac in alcohol throughout the emulsion to form the finished product.

8. A method of producing a cementitious emulsion, which consists in forming a solution of gum arabic in water, forming a solution of dammar resin in a volatile solvent, and dispersing the solution of dammar resin throughout the solution of gum arabic.

9. A method of producing a cementitious emulsion, which consists in dispersing 23 parts of a solution of dammar resin in carbon tetrachloride throughout 63½ parts of a solution of gum arabic in water, then dispersing throughout the resulting emulsion 11½ parts of a solution of shellac in alcohol, and finally dispersing throughout the resulting emulsion two parts of rosin oil.

10. A method of producing a cementitious emulsion which consists in adding a solution of dammar resin in carbon tetrachloride to a water solution of gum arabic to form an emulsion thereof, dispersing a solution of shellac in alcohol throughout the emulsion, and finally dispersing rosin oil throughout the resulting emulsion.

In witness whereof, we hereunto subscribe our names this 26th day of December A. D. 1924.

FRANK LOUIS ROMAN.
HARRY THOMAS WINSEMIUS.